Dec. 16, 1958  A. MAZZOLA  2,864,414
AUTOMATIC WOOD WORKING SLOTTING MACHINE
Filed Aug. 13, 1956  3 Sheets-Sheet 3
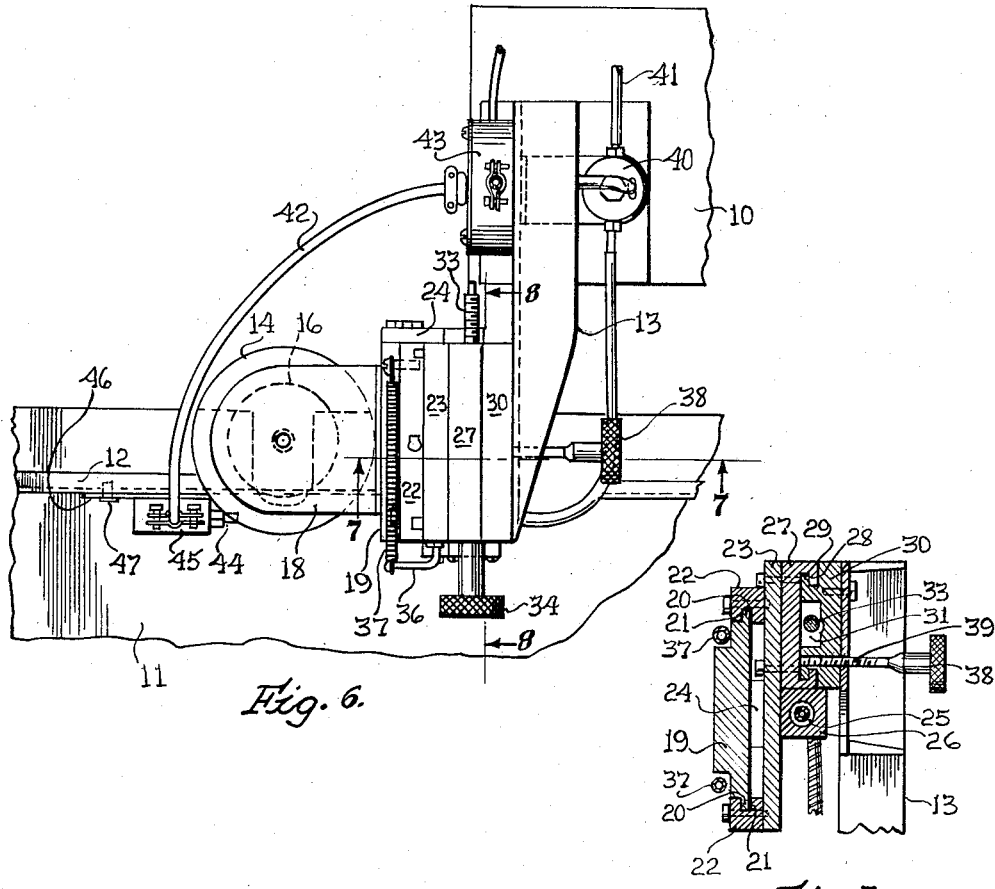
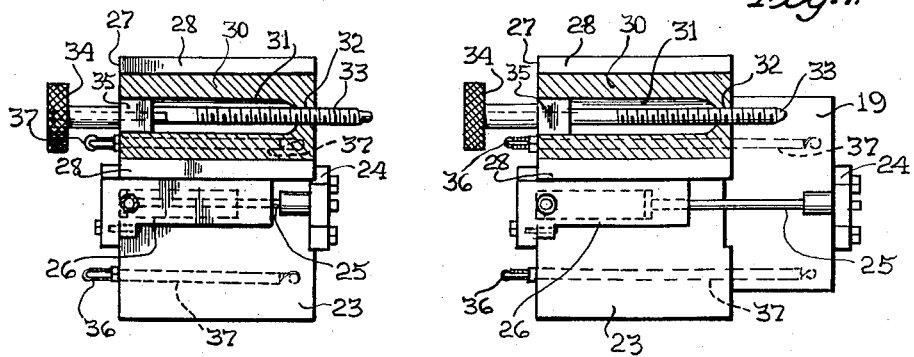
INVENTOR.
ANTHONY MAZZOLA
BY Shredy & Shredy
HIS ATTORNEYS.

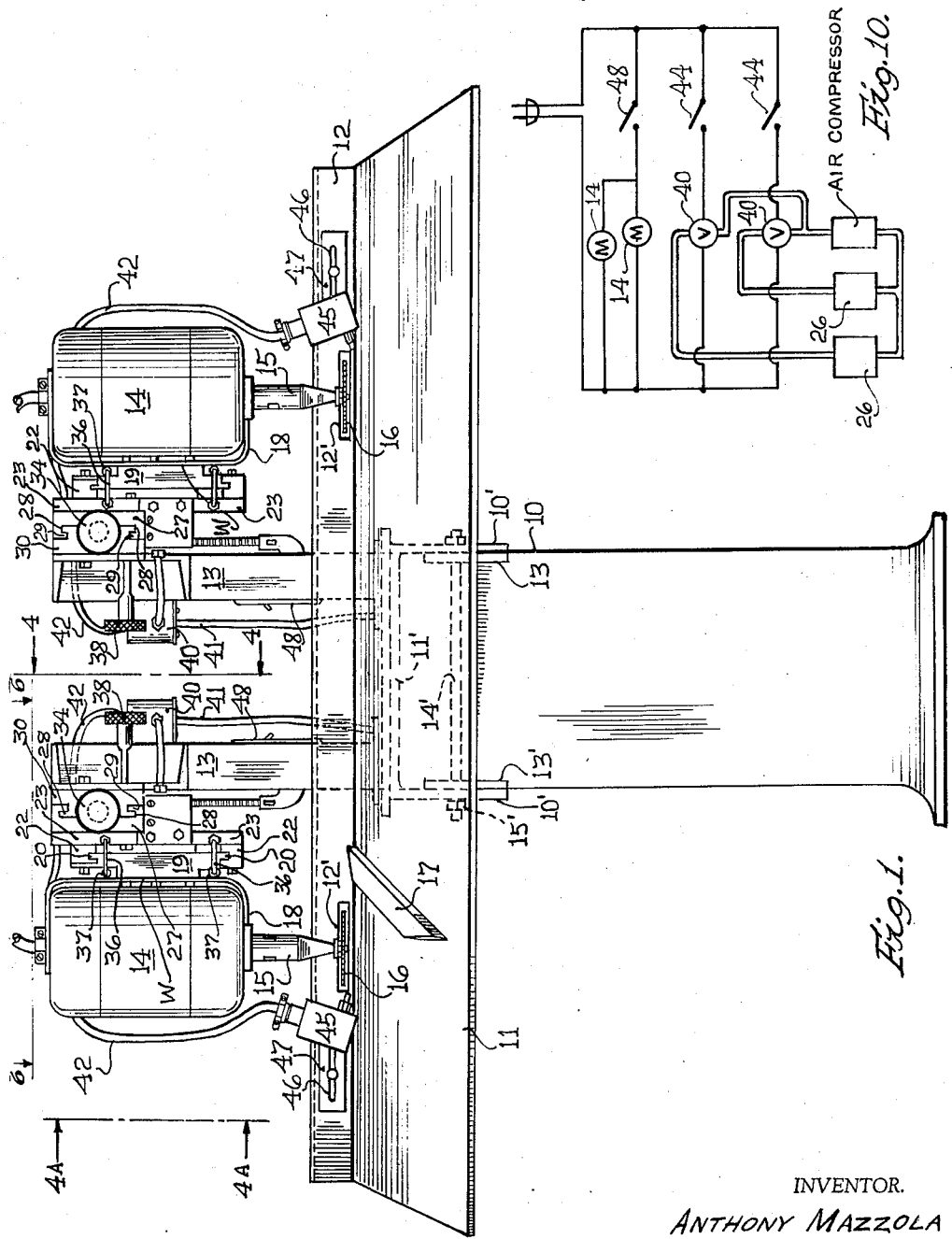

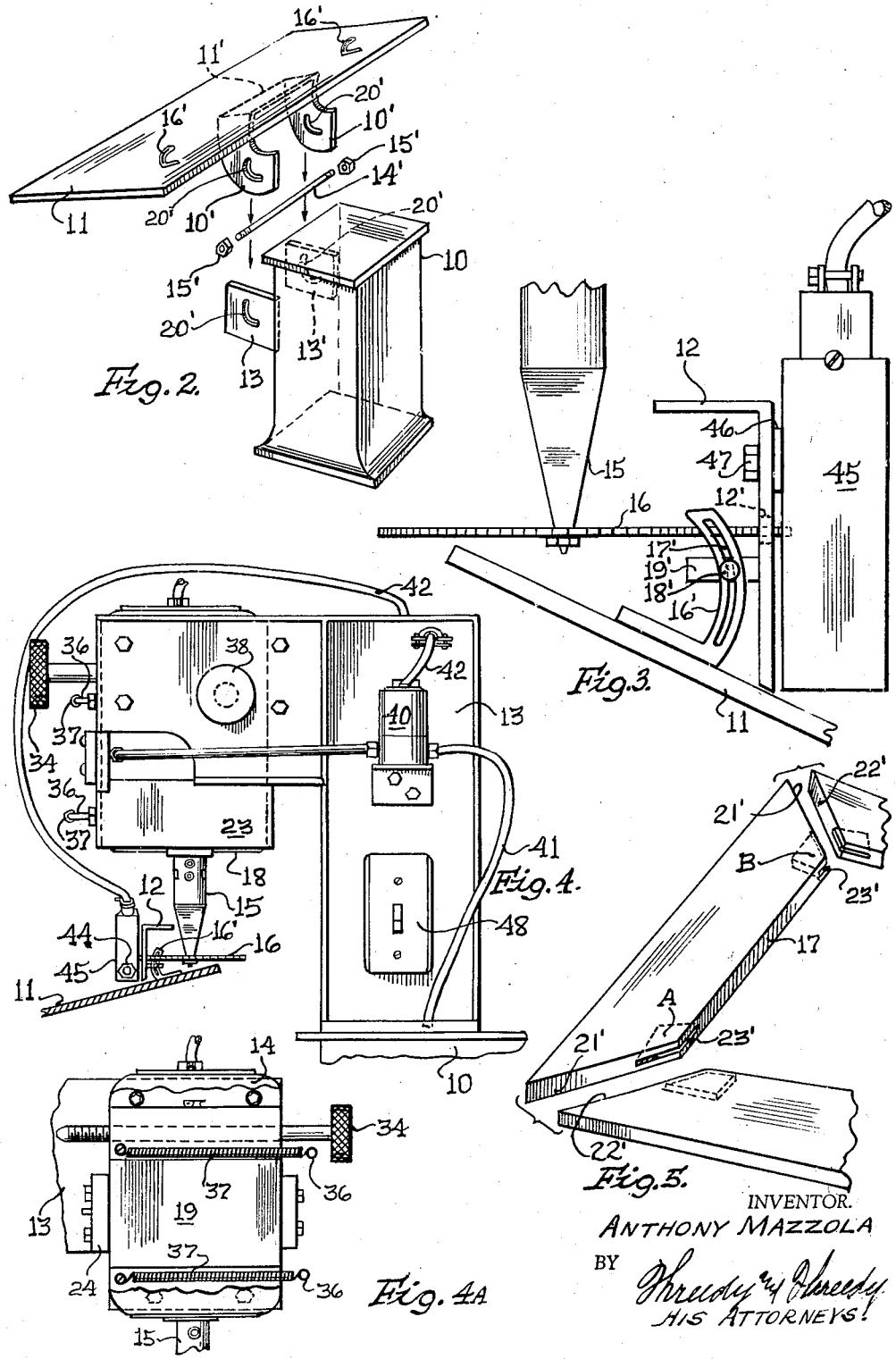

United States Patent Office 2,864,414
Patented Dec. 16, 1958

2,864,414

AUTOMATIC WOOD WORKING SLOTTING MACHINE

Anthony Mazzola, Westmont, Ill.

Application August 13, 1956, Serial No. 603,642

12 Claims. (Cl. 144—136)

My invention relates to a new and useful improvement in an automatic wood working slotting machine and has for its principal object the provision in a device of this character whereby a slot cutting saw blade is automatically moved into and out of engagement with a workpiece.

Still another object of my invention is the provision in a device of this character of a pneumatically operated saw moving means.

Yet another object of my invention is the provision of a device of this character wherein there is a means for limiting the length of a slot cut in a workpiece.

Another and equally important object of my invention is the provision in a device of this character for adjusting the position of a saw cutter blade with respect to a workpiece.

Another important object of my invention is the provision of a device of this character wherein there is a means engageable by the workpiece for pneumatically removing the saw blade from the workpiece after a slot of predetermined length has been cut in the workpiece.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 1 is a front perspective view of my invention showing a right hand and left hand wood slotting apparatus;

Fig. 2 is a perspective view of the base and table as employed in my invention in exploded relation with respect to each other;

Fig. 3 is a fragmentary side elevational view showing the adjustable connection between the guide rail and the work table.

Fig. 4 is a fragmentary side elevational view taken on line 4—4 of Fig. 1;

Fig. 4A is a fragmentary side elevational view of the opposite side of the saw supporting means taken on line 4A—4A of Fig. 4;

Fig. 5 is a fragmentary perspective view of a finished wood piece showing the respective slotted mitered corners formed therein by the use of my invention;

Fig. 6 is a fragmentary top plan view of the saw supporting means;

Fig. 7 is a detail section view taken on line 7—7 of Fig. 6;

Fig. 8 is a detail sectional view taken on line 8—8 of Fig. 6;

Fig. 9 is a detail sectional view similar to Fig. 8 but with the parts in extended relation with respect to each other; and Fig. 10 is a schematic circuit showing the electrical and pneumatic circuits as employed in my invention.

The object of my improved slotting machine is to afford a method of simply and easily cutting a slot at various desired degrees in the meeting surfaces of mitred joints formed from moldings suitable for use in picture framing, furniture making and the like.

Referring to Figs. 1 and 2, I show a base 10 for supporting a tiltable work table 11. This base 10 provides horizontally extending flange members 13 and 13'. The work table 11 is provided with a substantially U-shaped member 11' carried by the under side of the table 11. The extending arms of this U-shaped member 11' provide actuated attaching elements 10' which are adapted to be positioned to the outside of the flange members 13 and 13' as seen in Fig. 1. The flanges 13 and 13' as well as the attaching elements 10' are each provided with corresponding arcuated slots 20'. Through these actuated slots 20' when the attaching elements 10' are in facial abutment with the outer face of the flange members 13 and 13', extend a rod 14'. The opposite ends of this rod 14' are threaded to receive suitable nuts 15'. Through the above described connection between the base 10 and the table 11, the table 11 is tiltable with respect to said base 10.

The table 11 has a guide rail 12 which may be tilted with respect to the table 11. The means employed in my present invention for tilting the rail 12 with respect to the table 11 consists of arcuated arms 16' carried on the upper surface of the table 11 adjacent opposite side edges thereof. These arcuated arms 16' are provided with arcuated slots 17' through which a nut and bolt arrangement 18' is adapted to extend. This nut and bolt arrangement 18' is carried by an arm 19' extending rearwardly from the guide rail 12. This guide rail 12 has formed in its elongated vertical face slots 12' through which projects a circular horizontal saw blade 16.

Above the table 11 and at one side of the free end of the inverted L-shaped supporting members 13 are mounted electric motors 14. These motors 14 are mounted in a vertical position with the drive shaft 15 pointed in a downward direction. On the drive shaft 15 is mounted an arbor of well-known construction for holding a saw blade 16 in a horizontal plane. It should be noted that in Fig. 1 the slotting machine is illustrated as employing two motors each operating a saw blade. By such arrangement, both mating, mitred ends of a piece of work 17 may be slotted in one operation, i. e., the workpiece 17 is slotted at one end by one saw and then turned around in the operator's hands and slotted at the other end by the other saw. Such arrangement permits the workpiece to be handled without clamping the workpiece to the table in any manner. It also permits the slotting operation to be performed without any change in the adjustment of the table 11 and depth guide rail 12.

As the members 13 and motors 14 together with their associated parts and elements hereinafter described, are of the same construction and perform the same function, I shall for the sake of brevity describe but one of the units.

Suitably attached to the motor 14 is a substantially U-shaped bracket 18 (Fig. 5). The motor 14 is fixedly mounted between the ends of this U-shaped bracket 18, in any suitable manner. This bracket 18 is in turn rigidly mounted by welding along the line W, in facial abutment to a slide plate 19. This slide plate 19 has its opposite horizontally extending edges formed with laterally extending flanges 20 (Fig. 7). These flanges 20 slidably engage in opposite corresponding channels 21 formed in guide blocks 22 mounted on a plate 23. The rear of the slide plate 19 has a lateral horizontally extending base portion 24 (Figs. 8 and 9). This base portion 24 has mounted on one side thereof the free end of a plunger 25 of an air cylinder 26. The purpose and operation of the air cylinder 26, together with the plunger 25 and its operative connection to the base portion 24 of the slide plate 19 will be hereinafter described.

The plate 23 at its upper portion has connected on its side opposite the guide blocks 22 (Fig. 7) a guide plate 27. This guide plate 27 is provided on its free side with spaced apart confronting flanges having grooves 28 formed therein. These grooves 28 receive oppositely extending flanges 29 of a base plate 30. This base plate 30 is in turn connected by any suitable means, such as by nuts and bolts, to the free end of the inverted L-shaped member 13, as shown in Fig. 7.

Between the flanges 29 of the base plate 30 there is formed a hollowed out portion forming a well 31. The base of this well 31 has a threaded aperture 32 formed therein. Threadable through the aperture 32 is a threaded adjusting rod 33. This rod 33 is equipped at its free end with a knurled handle 34. The rod 33 has a portion securely journalled through a block 35 of the guide plate 27, as viewed in Fig. 9. This block 35 is of a size so that it is adapted for longitudinal movement through the well 31 when the rod 33 is threaded through the aperture 32 at the base of the well 31. As the block 35 is an integral part of the guide plate 27, it is readily ascertainable that the guide plate 27 is threadably adjustable with respect to the base plate 30 for a purpose explained hereinafter.

Referring to Figs. 5 and 6, it is there shown that the plate 23 is provided with two angle rods 36. Each of the ends of these rods 36 has connected thereto one end of a coil spring 37. The other end of the spring 37 is connected to the slide plate 19 and resists movement of the latter through a horizontal plane when the slide plate 19 is moved by actuation of the plunger 25 of the air cylinder 26.

Through the threading of the rod 33 in the aperture 32 at the bottom of the well 31, the plate 23 as well as the slide plate 19 may be adjustably positioned with respect to its vertical alignment over the work table 11. As the slide plate 19 supports the motor 14 which in turn carries the saw blade 16, it is clearly understood that the saw blade 16 is also adjustably positionable with respect to the table 11.

To maintain the plate 23 and slide plate 19 in their adjusted position, I provide a locking member 38. This member 38 has a portion 39 threaded through the member 13 and the base plate 30 and has its free threaded end threadable into engagement with the guide plate 27, as viewed in Fig. 7. As such, the member 38 will frictionally lock the guide plate 27 in its adjusted position.

The air cylinder 26 has suitable air line connections with a solenoid valve 40 supported by one side of the member 13. This valve 40 is in turn through a like air line connection 41 operatively connected to a compressed air supply (not shown). The valve 40 is in turn connected by a conductor 42 through an electrical junction box 43 to a micro switch 44 supported by the guide rail 12.

The micro switch 44 is supported by a bracket 45 having a laterally extending slotted flange 46. Threadable through the slot of the flange 46 and into an aperture formed in the guide rail 12 is a locking bolt 47. The length of the slot to be cut in the molding can be varied by placement of the micro switch 44 with respect to the guide rail 12. The micro switch 44 can be moved the length of the slot in the flange 46, longitudinally of the guide rail 12.

The motor 14 is electrically connected to a master switch 48 supported by the member 13. This master switch 48 controls operation of the motor 14 and saw blade 16.

Referring to Fig. 5, I show a wood work piece 17. This wood work piece 17 has its opposite ends mitered as at 21. These mitered ends 21 are adapted to abut corresponding mitered ends 22' of other parts of a picture frame. The inside abutting corners of the frame pieces are to be slotted as at 23'. Into this slot 23' is then driven a suitable clamp nail, not shown. As it is apparent that the mitered cut on the work piece 17 extends in opposite directions in order to slot each of the innermost corners of said work piece 17, I employ the use of two electrical motors 14 together with the associated parts as hereinbefore described. By this double use, I can slot such corners from one side of the table 11 merely by reversing the work piece 17 with respect thereto. As an example, I may slot the inside corner A by the apparatus shown on the left hand side of Fig. 1. With the apparatus continuing to operate, I may slot the opposite inside corner B with the apparatus shown on the right hand side of Fig. 1. It is readily apparent that from this arrangement, once the table 11 is tilted into its desired position and the guide rail 12 is likewise tilted so that it presents a vertical guide face for the work piece 17, the work piece 17 may have its opposite inside corners slotted merely by reversing its position with respect to the table 11.

In Fig. 10, I have illustrated a schematic electrical circuit showing the motors 14 together with the master switch 48. Each of the valves 40 are shown in connection with their micro switches 44. Each of the valves 40 is shown schematically connected to pneumatically operate its appropriate cylinders 26.

The operation of the machine is as follows:

The table 11 is adjusted to the desired angle of the slot to be cut. The micro switch 44 is adjusted with respect to the saw blade 16 to determine the length of the slot to be cut in the molding 17. The guide plate 27 is adjusted through the adjustment of the rod 31, to determine the depth of the slot to be cut in the molding 17. The master switch 48 is turned on. This permits the electrical motor 14 to operate and to turn the circular saw blade 16. The workpiece is placed upon the table 11 with the end to be slotted pushed against the guide rail 12. The workpiece is then moved in the direction of the saw blade 16 and the blade 16 will cut a slot in the molding 17 of the desired depth. As the workpiece 17 is manually moved over table 11, it will engage the micro switch 44. The micro switch 44 in turn will operate the solenoid valve 40, permitting compressed air to pass to the air cylinder 26. The air cylinder 26 will then expel its plunger 25, and the plunger 25 through connection 24 with the slide plate 19, will move the slide plate 19 in a horizontal rearward direction with respect to the table 11. As the motor 14 and the saw blade 16 are mounted on the slide plate 19, it is readily apparent that it also will move in a horizontal rearward direction with respect to the table 11. As the saw blade 16 is so moved, it will disengage the workpiece 17, which is then turned around by the operator and a similar operation performed by the other of the motors 14 and saw blade 16.

The operation of retracting the saw blade from the work piece is highly desirable. As the workpiece is being slotted at different angles, the removal of the workpiece from the saw blade would necessitate backing the workpiece up over the saw blade to its starting position, which operation is hazardous to the safety of the operator and highly conducive to spoilage of the molding by distortion or tearing of the slot cut therein. Therefore, it is the purpose of this invention to conveniently and successfully withdraw the saw blade from the slot cut in the molding. My invention also permits a ready and simple adjustment for the depth, length and angle of the slot to be cut.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. A slotting machine comprising a tiltable work table, a base for said table, a workpiece guide rail supported at one end of said table, supporting members mounted on said base and having an electric motor supported thereby above and in spaced relation to said table and said guide rail, a circular saw operated by said motor and operable through a slot formed in said guide rail, means for moving said motor and said saw from work-engaging position, means for restoring said motor and said saw in a work-engaging position with respect to said table and said guide rail, means for adjusting the length of movement of said moving means, and means engageable by the workpiece for actuating said moving means.

2. A slotting machine as defined by claim 1 in which the moving means is pneumatically operated.

3. A slotting machine as defined by claim 1 in which the restoring means consists of a coil spring expandible by said moving means.

4. A slotting machine as defined by claim 1 in which the actuating means for said moving means is a work-engaging switch.

5. A slotting machine as defined by claim 1 in which the actuating means for said moving means is a work-engaging switch carried by said guide rail adjacent the slot formed therein.

6. A slotting machine comprising a tiltable work table, a base for said table, a workpiece guide rail adjustably supported by said table, a supporting member mounted on said base and having an electric motor supporting thereby above and in spaced confronting relation to said table and said guide rail, means for removably connecting said motor to said supporting member, said means including a base plate provided by said supporting member and a slide plate for fixedly carrying said motor, a circular saw operated by said motor and operable through a slot formed in said guide rail, means on said base plate and cooperating with said slide plate for slidably connecting said slide plate to said base plate, means operable on said slide plate for moving said slide plate and said motor together with said saw in one direction with respect to said base plate and out of work engaging position, means for moving said slide plate and said motor in an opposite direction with respect to said table and into work engaging position, means for regulating the amount of movement of said first-mentioned moving means, and means engageable by the workpiece for actuating said first-mentioned moving means.

7. A slotting machine as defined by claim 6 in which the first-mentioned slide plate moving means is pneumatically operated.

8. A slotting machine as defined by claim 6 in which the work engaging means is a switch carried by said guide rail adjacent the slot formed therein.

9. A slotting machine as defined by claim 6 wherein the second-mentioned slide plate moving means consists of a coil spring expandible by said first-mentioned slide plate moving means.

10. A slotting machine as defined by claim 6 in which the actuating means for said first-mentioned slide plate moving means is a work engaging switch.

11. A slotting machine comprising a tiltable work table, a base for said table, a workpiece guide rail adjustably supported by said table, a supporting member mounted on said base and having an electric motor supported thereby above and in spaced confronting relation to said table and said guide rail, means for removably connecting said motor to said supporting member, said means including a base plate provided by said supporting member and a slide plate for fixedly carrying said motor, a circular saw operated by said motor and operable through a slot formed in said guide rail, means on said base plate and cooperating with said slide plate for slidably connecting said slide plate to said base plate, means operable on said slide plate for moving said slide plate and said motor together with said saw in one direction with respect to said base plate and out of work engaging position, means for moving said slide plate and said motor in an opposite direction with respect to said table and into work engaging position, means having operative connection with said base plate and said slide plate for adjusting the length of movement of said slide plate when moved by said first-mentioned moving means.

12. A slotting machine as defined by claim 11 in which the adjusting means is a rod having fixed connection to said slide plate and threadable connection with said base plate for positioning said slide plate with respect to said base plate.

References Cited in the file of this patent
UNITED STATES PATENTS

| | | |
|---|---|---|
| 1,636,538 | Whipple | July 19, 1927 |
| 1,776,238 | Smith | Sept. 16, 1930 |
| 1,803,068 | McKeage | Apr. 28, 1931 |
| 1,850,444 | Brumell | Mar. 22, 1932 |
| 2,109,061 | Dietrich | Feb. 22, 1938 |
| 2,353,202 | Tautz | July 11, 1944 |
| 2,619,997 | Gaskell | Dec. 2, 1952 |

OTHER REFERENCES

"American Machinist," May 6, 1948, page 124.